(12) United States Patent
Chen et al.

(10) Patent No.: US 9,966,091 B2
(45) Date of Patent: May 8, 2018

(54) MGO BASED PERPENDICULAR SPIN POLARIZER IN MICROWAVE ASSISTED MAGNETIC RECORDING (MAMR) APPLICATIONS

(71) Applicant: Headway Technologies, Inc., Milpitas, CA (US)

(72) Inventors: Wenyu Chen, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days. days.

(21) Appl. No.: 14/987,127

(22) Filed: Jan. 4, 2016

(65) Prior Publication Data

US 2016/0118065 A1   Apr. 28, 2016

Related U.S. Application Data

(62) Division of application No. 14/468,399, filed on Aug. 26, 2014, now Pat. No. 9,230,571.

(51) Int. Cl.
*G11B 5/31* (2006.01)
*G11B 5/127* (2006.01)
(Continued)

(52) U.S. Cl.
CPC ............ *G11B 5/315* (2013.01); *G11B 5/1278* (2013.01); *G11B 5/147* (2013.01); *G11B 5/314* (2013.01);
(Continued)

(58) Field of Classification Search
None
See application file for complete search history.

(56) References Cited

U.S. PATENT DOCUMENTS

| 7,978,442 B2 | 7/2011 | Zhang et al. | |
| 8,203,389 B1 * | 6/2012 | Zhou ................... | H03B 15/006 331/3 |

(Continued)

OTHER PUBLICATIONS

"Microwave Assisted Magnetic Recording," by Jian-Gang Zhu, et al., IEEE Transactions on Magnetics, vol. 44, No. 1, Jan. 2008, pp. 125-131.

(Continued)

*Primary Examiner* — William J Klimowicz
(74) *Attorney, Agent, or Firm* — Saile Ackerman LLC; Stephen B. Ackerman

(57) ABSTRACT

A design for a microwave assisted magnetic recording device is disclosed wherein a spin torque oscillator (STO) between a main pole and write shield has a spin polarization (SP) layer less than 30 Angstroms thick and perpendicular magnetic anisotropy (PMA) induced by an interface with one or two metal oxide layers. Back scattered spin polarized current from an oscillation layer is used to stabilize SP layer magnetization. One or both of the metal oxide layers may be replaced by a confining current pathway (CCP) structure. In one embodiment, the SP layer is omitted and spin polarized current is generated by a main pole/metal oxide interface. A direct current or pulsed current bias is applied across the STO. Rf current may also be injected into the STO to reduce critical current density. A write gap of 25 nm or less is achieved while maintaining good STO performance.

11 Claims, 7 Drawing Sheets

(51) Int. Cl.
*G11B 5/147* (2006.01)
*G11B 5/00* (2006.01)
*G11B 5/39* (2006.01)

(52) U.S. Cl.
CPC .......... *G11B 5/3146* (2013.01); *G11B 5/3909* (2013.01); *G11B 2005/0024* (2013.01)

(56) References Cited

U.S. PATENT DOCUMENTS

| | | | |
|---|---|---|---|
| 8,270,112 B2 | 9/2012 | Funayama et al. | |
| 8,462,461 B2 | 6/2013 | Braganca et al. | |
| 8,488,373 B2* | 7/2013 | Zhang | C23C 14/025 |
| | | | 257/421 |
| 8,582,240 B1 | 11/2013 | Chen et al. | |
| 8,604,886 B2 | 12/2013 | Nikonov et al. | |
| 8,634,163 B2 | 1/2014 | Tanabe et al. | |
| 8,773,956 B1* | 7/2014 | Wang | G11B 5/314 |
| | | | 369/13.01 |
| 8,913,350 B2* | 12/2014 | Watts | B82Y 25/00 |
| | | | 360/324.2 |
| 2009/0257151 A1* | 10/2009 | Zhang | G01R 33/098 |
| | | | 360/324.2 |
| 2011/0279921 A1* | 11/2011 | Zhang | B82Y 10/00 |
| | | | 360/59 |
| 2011/0300409 A1* | 12/2011 | Yamada | G01S 19/30 |
| | | | 428/815.2 |
| 2012/0113540 A1* | 5/2012 | Zhang | G11B 5/1278 |
| | | | 360/59 |
| 2012/0126905 A1* | 5/2012 | Zhang | G11B 5/3146 |
| | | | 331/94.1 |
| 2012/0292723 A1 | 11/2012 | Luo et al. | |
| 2014/0008742 A1* | 1/2014 | Chen | G01R 33/098 |
| | | | 257/421 |
| 2014/0145792 A1* | 5/2014 | Wang | H01F 10/3272 |
| | | | 331/94.1 |
| 2015/0008547 A1* | 1/2015 | Pi | H01L 43/04 |
| | | | 257/421 |
| 2015/0091110 A1* | 4/2015 | Kuo | H01L 43/08 |
| | | | 257/421 |

OTHER PUBLICATIONS

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

* cited by examiner

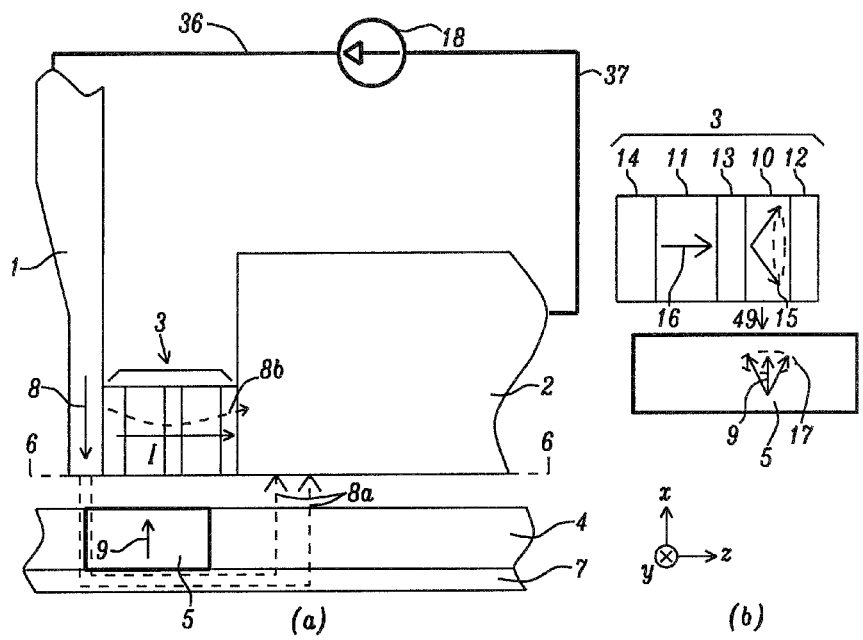
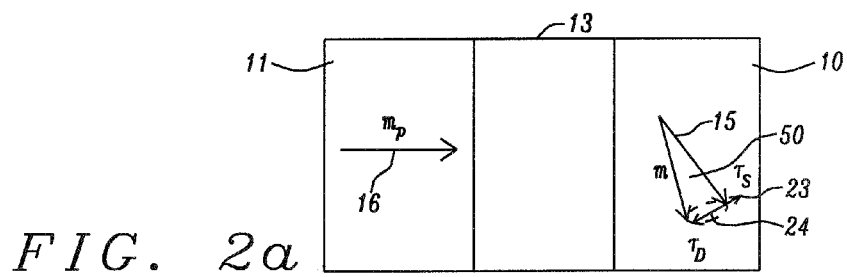
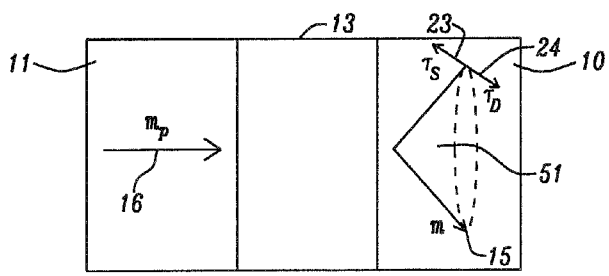
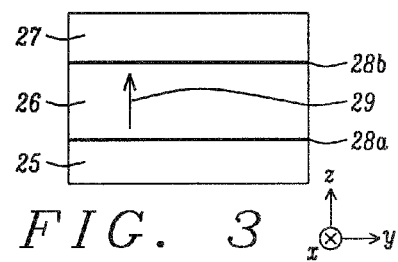
FIG. 1
FIG. 2a
FIG. 2b
FIG. 3

MGO BASED PERPENDICULAR SPIN POLARIZER IN MICROWAVE ASSISTED MAGNETIC RECORDING (MAMR) APPLICATIONS

This is a Divisional application of U.S. patent application Ser. No. 14/468,399 filed on Aug. 26, 2014, which is herein incorporated by reference in its entirety, and assigned to a common assignee.

RELATED PATENT APPLICATIONS

This patent application is related to U.S. Pat. No. 7,978,442 and U.S. Pat. No. 8,582,240, both assigned to a common assignee, and herein incorporated by reference in their entirety.

TECHNICAL FIELD

The present disclosure relates to shrinking the write gap distance between a main pole and write shield in a MAMR design for perpendicular magnetic recording (PMR) applications, and in particular to modifying a spin torque oscillator (STO) structure wherein a spin polarizer (SP) layer with perpendicular magnetic anisotropy (PMA) is thinned by including one or two adjoining metal oxide layers that enhance PMA in the SP layer while maintaining STO performance.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. Two main approaches currently being investigated are thermally assisted magnetic recording (TAMR) and microwave assisted magnetic recording (MAMR). The latter is described by J-G. Zhu et al. in "Microwave Assisted Magnetic Recording", IEEE Trans. Magn., vol. 44, pp. 125-131 (2008).

Spin transfer (spin torque) devices in MAMR writers are based on a spin-transfer effect that arises from the spin dependent electron transport properties of ferromagnetic-spacer-ferromagnetic multilayers. When a spin-polarized current passes through a magnetic multilayer in a CPP (current perpendicular to plane) configuration, the spin angular moment of electrons incident on a ferromagnetic layer interacts with magnetic moments of the ferromagnetic layer near the interface between the ferromagnetic and non-magnetic spacer. Through this interaction, the electrons transfer a portion of their angular momentum to the ferromagnetic layer. As a result, spin-polarized current can switch the magnetization direction of the ferromagnetic layer, or drive the magnetization into stable dynamics, if the current density is sufficiently high.

Referring to FIG. 1, a generic MAMR writer based on perpendicular magnetic recording (PMR) is depicted. There is a main pole 1 with a sufficiently large local magnetic field to write the media bit 5 on magnetic medium 4. Magnetic flux 8 in the main pole proceeds through the air bearing surface (ABS) 6-6 and into medium bit layer 4 and soft underlayer (SUL) 7. A portion of the flux 8a returns to the write head where it is collected by write shield 2. For a typical MAMR writer, the magnetic field generated by the main pole 1 itself is not strong enough to flip the magnetization of the medium bit in order to accomplish the write process. However, writing becomes possible when assisted by a spin torque oscillator (STO) 3 positioned between the main pole and write shield 2. The STO and medium bit 5 are enlarged in FIG. 1 side (b) and the former is comprised of a high moment magnetic layer 10, and a second magnetic layer 11 called a spin polarization (SP) layer that preferably has perpendicular magnetic anisotropy (PMA). Between layers 2 and 10, 10 and 11, and 11 and 1, there are nonmagnetic layers 12, 13, 14, respectively, made of a metal to prevent strong magnetic coupling between adjacent magnetic layers.

Assuming a medium bit 5 with a magnetization in the direction of 9 (pointing up) is being written by a flux field 8 pointing down as in FIG. 1 side (a), part of the magnetic flux 8b goes across the gap between main pole 1 and write shield 2, and this weak magnetic field can align the magnetization of SP layer 11 perpendicular to the film surface from left to right. An external current source 18 creates a bias current I across the main pole and write shield. The applied dc results in a current flow in a direction from the write shield through the STO 3 and into main pole 1.

Referring to FIG. 2a, the direct current generated by source 18 is spin polarized by magnetic layer 11, interacts with magnetic layer 10, and produces a spin transfer torque $\tau_s$ 23 on layer 10. Spin transfer torque has a value of $a_j$ m×m×$m_p$, where $a_j$ is a parameter proportional to the current density j, m is the unit vector 15 in the direction of the instantaneous magnetization for layer 10, and $m_p$ is the unit vector 16 in the direction of magnetization in layer 11. Spin transfer torque $\tau_s$ 23 has a representation similar to the damping torque $\tau_D$ 24, and with a specific current direction, $\tau_s$ 23 competes with $\tau_D$ 24, so that the precession angle 50 is from about 0 to 10 degrees. Only when the current density is above a critical value j, will $\tau_s$ 23 be large enough to widely open the precession angle of magnetization 15 in layer 10 such that the oscillation has a large angle 51 usually between 60° and 160° as indicated in FIG. 2b. The large angle oscillatory magnetization of layer 10 generates a radio frequency (rf) usually with a magnitude of several to tens of GHz. This rf field 49 (FIG. 1 side b) interacts with the magnetization 9 of medium bit 5 and makes magnetization 9 oscillate into a precessional state 17 thereby reducing the coercive field of medium bit 5 so that it can be switched by the main pole field 8.

The magnetic layer 10 is referred to as the oscillation layer (OL), and the aforementioned oscillation state is also achieved if main pole field 8 and medium magnetization 9 are in the opposite directions to those shown in FIG. 1. In this case, the direction of the SP magnetization 16 will be reversed, and OL as well as the medium bit will precess in the opposite direction with respect to the illustration in FIG. 1 side b.

In the prior art, seed layer 14 is typically thicker than 3 nm to prevent SP layer to main pole (MP) coupling. Moreover, SP layer 11 is normally >8 nm in thickness since laminates such as $(Co/Pt)_n$, $(Co/Ni)_n$, and $(FeCo/Ni)_n$ where n is a lamination number of about 5 to 30 are used to establish strong PMA. Total PMA for the SP layer must overcome the perpendicular demagnetization field so that SP magnetization 16 stays in the perpendicular to film plane direction without an external field. Non-magnetic layer 13 is typically 2 nm thick and the thickness of OL 10 is generally >10 nm. If the OL is too thin, magnetic moment 15 of OL cannot deliver a large enough rf field to assist recording. Non-magnetic layer 12 (often called a capping layer in the bottom STO design in FIG. 1b) is preferably >5 nm thick. Thus, a conventional STO stack representing the write gap is at least 28 nm thick. For a stable STO that can function with good yield, another 5-10 nm may need to be allocated to SP 11, OL 10, and capping layer 12 for a total STO thickness well over 30 nm.

Z. Zeng et al. in "High-Power Coherent Microwave Emission from Magnetic Tunnel Junction Nano-oscillators with Perpendicular Anisotropy", ACS Nano Vol. 6, No. 7, pp. 6115-6121 (2012), and H. Kubota et al. in "Spin-Torque Oscillator Based on Magnetic Tunnel Junction with a Perpendicularly Polarized Free Layer and in-Plane Magnetized Polarizer" in Applied Physics Express (Jap. Soc. of App. Physics), 6, pp. 103003-1-103003-3 (2013) both present ideas for devices such as an rf signal source and rf field detector with high power narrow band rf emission using a magnetic tunnel junction (MTJ) having a magnetic layer with PMA. A common feature is a MTJ that is comprised of a free magnetic layer with PMA that is not based on a laminated structure such as $(Co/Ni)_n$, but rather PMA is established by an interface between a MgO layer and a thin CoFeB or FeB layer. As a result, the free layer can be more easily driven into large angle oscillation with high power and a narrow frequency band. However, the aforementioned MTJ structure cannot be applied in a STO for MAMR applications mainly because the thin free layer has a low magnetic moment due to its thickness of around 2 nm that is required for the induced anisotropy field to overcome its demagnetization field in the perpendicular to plane direction. Even if the free layer can be driven into an oscillation angle at a similar level to that depicted in FIG. 1, total rf field applied to the magnetic medium is only 20% of that produced by a conventional STO for MAMR because of the low magnetic moment.

Clearly, current STO technology must be improved to enable a smaller write gap (WG) without compromising the rf field strength directed onto the magnetic medium in a MAMR application. PMR writer production already requires a WG to be at 25 nm, significantly less than state of the art STO structures with a WG near 30 nm or larger, in order to achieve a large enough field gradient for good writing performance. Although MAMR improves writing performance, a larger WG than desired reduces the field inside the head between the MP and write shield that is needed for MAMR to work at the required frequency. Therefore, reducing the WG thickness in the STO stack to 25 nm or less becomes a necessity if MAMR is to be widely accepted in the industry.

SUMMARY

One objective of the present disclosure is to reduce the thickness of a STO stack formed between a main pole and write shield in a MAMR writer thereby shrinking the write gap for PMR applications.

A second objective of the present disclosure is provide a thinned STO stack according to the first objective while maintaining the effectiveness of the SP and OL layers to deliver a rf field of sufficient strength to assist the write process.

A third objective of the present disclosure is to provide a thinned STO stack according to the first objective by using existing materials and processes that do not complicate STO fabrication.

According to one embodiment of the present disclosure, these objectives are achieved with a MAMR design having a STO stack of layers formed between a main pole and a write shield, and wherein the leads from the main pole and write shield enable a current to pass through the STO stack. The STO stack may have a bottom spin valve configuration wherein a seed layer, SP layer, non-magnetic spacer, OL, and capping layer are sequentially formed on the main pole and the capping layer contacts the write shield. SP layer thickness is less than 30 Angstroms (3 nm) and preferably from about 6 to 20 Angstroms so that substantial PMA is established when one or both of a SP layer top surface and bottom surface contact a metal oxide layer. Preferably, one or both of the seed layer and non-magnetic spacer are made of a metal oxide such as MgO to generate sufficient PMA to overcome the perpendicular demagnetization field within the SP layer and enable the SP layer to spin polarize the current directed to the OL. In another embodiment, the STO has a top spin valve configuration wherein a seed layer, the OL, non-magnetic spacer, SP layer, and capping layer are sequentially formed on the main pole. In this case, one or both of the non-magnetic spacer and capping layer are a metal oxide to enable a thin SP layer with substantial PMA.

A direct current or pulsed current flowing through the STO stack from the main pole to the write shield is converted to spin polarized current by the SP layer and interacts with the OL to cause the latter to oscillate with a large angle and a frequency that generates a rf field on a nearby magnetic medium thereby assisting a magnetic field from the main pole to switch a magnetic bit during a write process.

According to another embodiment, one or both of the seed layer and non-magnetic spacer in the STO bottom spin valve configuration has a confined current pathway (CCP) structure wherein metal pathways such as Cu are formed in a metal oxide matrix. In a STO top spin valve configuration, one or both of the non-magnetic spacer and capping layer may have a CCP structure in order to establish substantial PMA in the adjoining SP layer and improve reliability of the STO.

In yet another embodiment, the SP layer and non-magnetic spacer may be omitted and the main pole/metal oxide seed layer interface serves as a source of spin polarized current. Here, a seed layer that is a metal oxide, the OL, and a capping layer are sequentially formed on the main pole. The main pole/metal oxide interface generates PMA in a portion of the main pole adjoining the seed layer such that current entering the STO is polarized in the perpendicular to plane direction and causes oscillation of sufficient magnitude within the OL to generate a rf field that assists the write process on the magnetic medium.

In all embodiments, a current is applied between the main pole and write shield during the write process and may be a direct current or a pulsed current. In some embodiments, a rf current injection may be combined with the direct current or pulsed current to reduce critical current density in the STO.

BRIEF DESCRIPTION OF THE DRAWINGS

FIG. 1 is a cross-sectional view of a conventional MAMR structure with a STO formed between a main pole and write shield wherein an external direct current source creates a bias current between the main pole and write shield.

FIG. 2*a* is a cross-sectional view of the spin polarization (SP) layer and oscillation layer (OL) in the STO in FIG. 1 and depicts a small precession angle in the OL magnetization.

FIG. 2*b* is a cross-sectional view of the SP layer and OL in FIG. 1 when the critical current density in the STO is above a threshold value that causes the OL magnetization to achieve a large precession angle and produce a rf field.

FIG. 3 is a cross-sectional view of a magnetic layer wherein perpendicular magnetic anisotropy is generated by an interface with one or both of a top non-magnetic layer and a bottom non-magnetic layer comprised of a metal oxide.

DETAILED DESCRIPTION

Figure 4:
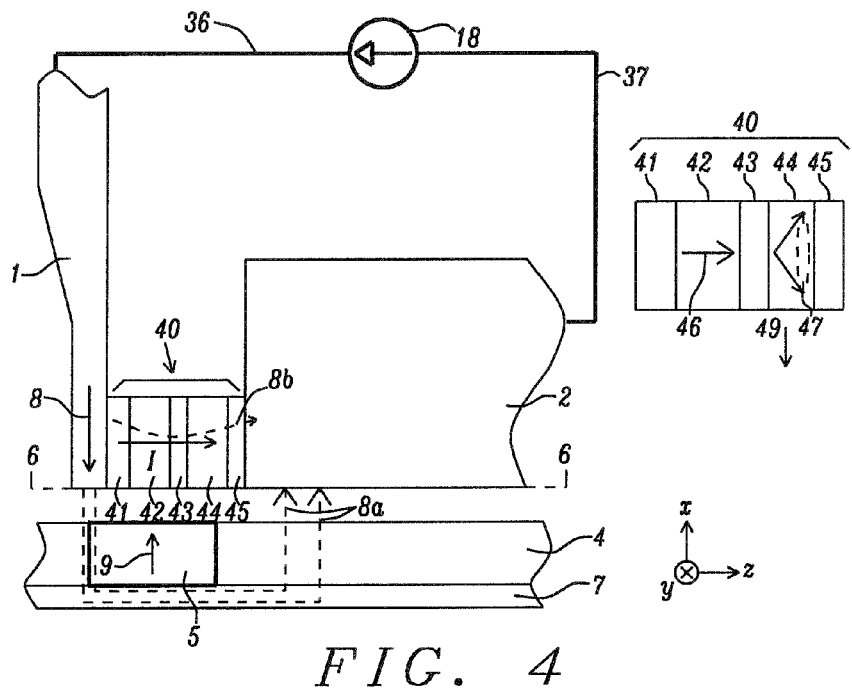
FIG. 4 is a down-track cross-sectional view of a MAMR structure according to an embodiment of the present disclosure wherein a STO is formed between a main pole and a write shield in a bottom spin valve configuration, and has at least one metal oxide layer adjoining a spin polarization layer.

The present disclosure is a MAMR structure comprising a spin torque oscillator (STO) formed between a main pole and a write shield in a PMR write head, and in particular, relates to a SP layer with reduced thickness that is enabled by an SP layer interface with one or two metal oxide layers. Thus, the write gap distance between main pole and write shield is reduced while maintaining STO performance in assisting the magnetic pole during a write process. In all drawings, the z-axis is a down-track direction, the y-axis is a cross-track direction, and the x-axis is along a direction between an air bearing surface and a back end of the MAMR structure.

Referring to FIG. 3, a magnetic layer 26 is formed between two non-magnetic layers 25, 27 and may be a reference layer or free layer in a magnetic tunnel junction, for example. According to one aspect, when the magnetic layer is a laminate such as $(Co/Ni)_n$ where n is a lamination number, perpendicular magnetic anisotropy PMA 29 is intrinsic because of the spin-orbit interactions between the 3d and 4s electrons of Co and Ni atoms. When considering a candidate for a thinned SP layer in a STO stack that is useful for WG reduction, a laminate is not acceptable because a laminate thickness of at least 8 nm is necessary to provide sufficient PMA. We have found that a magnetic layer with a thickness in the range of 2 to 3 nm is ideally suited as a thin SP layer wherein PMA is induced by at least one metal oxide/SP layer interface. Thus, when magnetic layer 26 is a thin Co alloy or Fe alloy about 6 to 30 Angstroms thick, and one or both of non-magnetic layers 25, 27 are MgO or another metal oxide, there is sufficient PMA 29 generated by interfaces 28a, 28b for the magnetic layer to serve as a SP layer in a STO device.

The total interface induced perpendicular anisotropy energy potential ($E_{ani}$) for a magnetic layer is expressed by the equation $E_{ani}=-n \cdot A \cdot S$ where A is an interface property related constant, S is the interface area S, and n is the number of interfaces (1 or 2) for the magnetic layer with a metal oxide layer. The effective anisotropic field is expressed by $H_{ani}=-\partial E_{ani}/\partial m=n \cdot A/(M_S \cdot t)$, where m is the total magnetic moment of the magnetic layer, $M_S$ is the magnetization density, and t is the thickness of the magnetic layer. The $H_{ani}$ equation indicates that increasing t causes a weaker perpendicular anisotropy field, and conversely, a stronger perpendicular magnetic anisotropy (PMA) is produced by reducing the thickness t.

One important requirement of a SP layer is that the perpendicular anisotropy field ($H_{ani}$) must be large enough to overcome the demagnetization field in the perpendicular direction in the absence of an external magnetic field. Conventional SP layers meet this requirement by way of a thickness that is generally 8 nm or greater. The demagnetization field is expressed by $H_{demag}=4\pi M_S N_Z$ where $N_Z$ is the geometric demagnetization factor in the perpendicular (z-axis) direction, and typically $N_Z \leq 1$ for a thin magnetic film. Note that the demagnetization is a bulk parameter and only $N_Z$ is weakly dependent on the layer thickness if t is substantially less than the width of the magnetic layer in a cross-track direction. Thus, once the magnetic layer thickness t satisfies the equation $t<nA/4\pi Ms^2 \cdot Nz$, the magnetic moment of the magnetic layer can be aligned in a direction that is perpendicular to the film plane. Typically, the magnetic layer thickness must be thinner than 3 nm to achieve PMA in the absence of an external field when there is no intrinsic PMA property available by way of a laminated stack in the prior art.

Although PMA is one requirement for a SP layer in a STO device, it is not the only desired property in a SP layer. Another necessary property is sufficient coercive field (Hc) in a perpendicular to plane direction such that SP layer magnetization cannot be easily flipped. He may be expressed as $Hc=H_{ani}-H_{demag}$. Moreover, He should not be so large that a gap field 8b (FIG. 1) of several thousand Oersted is not able to switch the magnetic layer's magnetization. Based on the $H_{ani}$ equation, one is able to tune both PMA and He by adjusting the thickness of the magnetic layer, and the number of metal oxide/magnetic layer interfaces (one or two).

A third important property of a SP layer is stability in the context of spin transfer torque induced by back-scattered spin currents. It is known that a SP layer 11 in FIG. 1, for example, generates a spin polarized current to interact with OL 10. Furthermore, OL 10 may also spin polarize the current to interact with SP layer 11. Therefore, a SP layer must be stable to back scattered spin current from an oscillation layer. We will discuss this aspect in more detail later with regard to the embodiments of the present disclosure.

In FIG. 4, a first embodiment of the present disclosure is illustrated and retains the main pole, write shield, and magnetic medium structures of FIG. 1. In this case, a direct current (100% duty cycle) or pulsed current I flows from a source 18 through lead 36 to main pole 1 and then passes through STO 40 and write shield 2 before exiting through lead 37. The pulsed current may be at a scale of 0.1 ns "on" followed by an off period of a fraction of a nanosecond to multiple nanoseconds. A key feature is STO 40 that has a bottom spin valve configuration wherein a seed layer 41, SP layer 42, non-magnetic spacer 43, OL 44, and capping layer 45 are sequentially formed on the main pole such that a bottom surface of the seed layer contacts the main pole and a top surface of the capping layer contacts the write shield, and one or both of layers 41, 43 are a metal oxide to induce PMA in the SP layer less than 30 Angstroms thick. As mentioned previously, the z-axis is the medium moving direction and is also known as the down-track direction.

During a write process, magnetic flux 8 passes through the ABS 6-6 and transits the magnetic medium 4 and soft underlayer 7 and flux 8a re-enters the write head through the write shield 2. Under a gap field 8b of several thousand Oe and a dc bias across the STO, the write process is assisted by a spin polarized current (not shown) passing from the SP layer 42 to the OL 44 with sufficient magnitude (critical current density) to cause a large angle oscillation 47 with a certain amplitude and frequency in the OL that imparts a rf field 49 on medium bit 5. The combined effect of the rf field and magnetic field 8 enables the magnetization 9 in the bit to be switched with a lower magnetic field than when only magnetic field 8 is applied. The advantage of the present disclosure is that critical current density of the spin polarized current may be lowered to $10^7$ A/cm$^2$ compared with a value of $10^8$ A/cm$^2$ in conventional STO designs because of the higher spin polarization induced by at least one SP layer/metal oxide interface as described below with regard to seed layer 41 and non-magnetic spacer 43. As a result, concern for STO reliability is substantially minimized.

According to one aspect, the seed layer 41 is a non-magnetic layer that may a typical seed layer comprised of one or more metals or alloys such as Ta, Ru, NiCr, and the like, or the seed layer may be a metal oxide layer. When the seed layer is a metal oxide or a laminate made of one or more of MgO, AlOx, TaOx, or RuOx, interfacial perpendicular anisotropy is induced in SP layer 42. The metal oxide or laminated may be sputter deposited or formed by any oxidation process of one or more metal layers, and preferably has a thickness of about 10 to 20 Angstroms.

SP layer 42 may be comprised of a Co alloy or a Fe alloy including but not limited to CoFeB, CoFe, CoFeNi, FeB, and CoB, and has a thickness of <30 Angstroms, and preferably 20 Angstroms or less to enable PMA therein to be maximized according to the $H_{ani}$ equation presented earlier. The aforementioned thicknesses represent a considerable decrease from the usual 80 Angstrom or larger thickness for a conventional SP layer, and offer a realistic approach to achieve a write gap of 25 nm or less. It is believed that He will be sufficiently large to prevent the magnetic moment of the SP layer from being too easily flipped. As for stability with regard to back scattered spin current from the OL, we believe that under the bias direction where positive current I flows from the SP layer to the OL, the OL oscillates with the correct chirality to assist recording, and the back scattered spin current works with the damping torque to stabilize the SP layer magnetization. In other words, although the SP layer may be vulnerable to spin transfer torque due to its low moment, the SP layer is still expected to be stable. It should be understood that with an opposite current polarity, the dynamics induced by the spin transfer torque will be quite significant. However, the opposite current polarity is not a factor since it does not help MAMR nor is the opposite current polarity required by a MAMR write process.

Non-magnetic spacer 43 may be a metal layer with good conductivity such as Cu. In an alternative embodiment, the non-magnetic spacer is comprised of a metal oxide layer or laminate that is one or more of AlOx, MgO, AlTiOx, MgZnOx, and ZnOx. TaOx and RuOx are not good choices for the non-magnetic spacer since they are spin sinks and will not allow enough spin polarized current to reach the OL to cause oscillation at a desired frequency and large angle. The non-magnetic spacer has a thickness of about 30 Angstroms when made of a metal, and preferably 10 to 20 Angstroms when comprised of a metal oxide.

OL 44 may be comprised of Fe alloys or Co alloys such as CoFeB, CoFe, CoFeNi, or a combination thereof, or may be a laminated stack $(A1/A2)_n$ where n is a lamination number and A1 is one of Co, Fe, CoFe, CoFeR in which R is a non-magnetic element, and A2 is one of Ni, NiCo, and NiFe, although other magnetic materials are acceptable. Magnetization of the OL may be in-plane or perpendicular to the plane of the layer in the absence of a bias current.

Capping layer 45 is a non-magnetic layer that is preferably one or more of Ta, Ru, and Cu, although other conductive materials that may also function as an etch mask during formation of a STO pattern are acceptable. STO layers mentioned above have planes that are aligned in the (x, y) plane and have a thickness in a z-axis direction. Preferably, one or both of seed layer 41 and non-magnetic spacer 43 are a metal oxide layer in order for PMA ($H_{ani}$) in the SP layer 42 to be sufficiently large so that spin polarized current flowing to the OL 44 is capable of causing a large angle oscillation in the OL at a frequency closely matching that of the bit to be written to in the magnetic medium.

Figure 5:
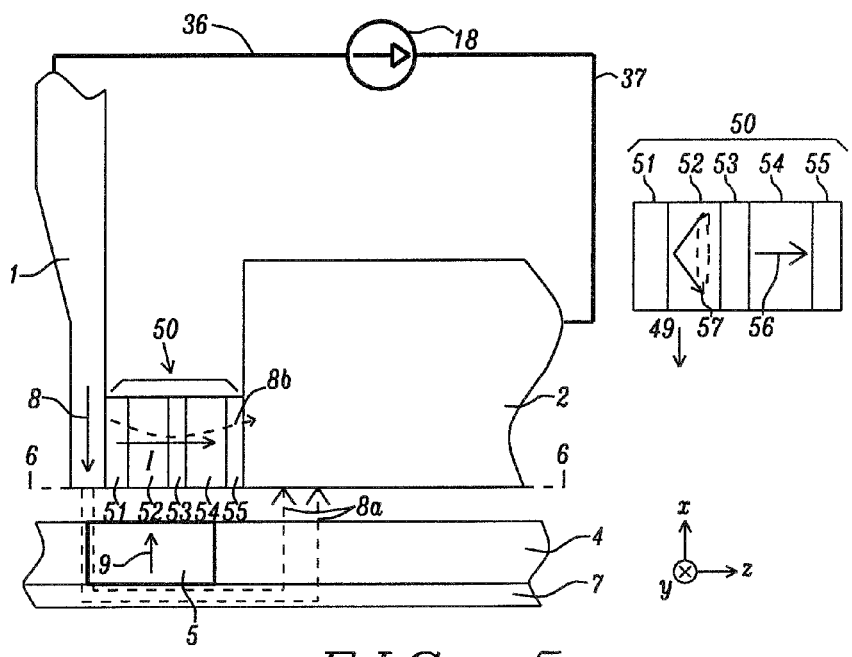
FIG. 5 is a down-track cross-sectional view of a MAMR structure according to an embodiment of the present disclosure wherein a STO is formed between a main pole and a write shield in a top spin valve configuration, and has at least one metal oxide layer adjoining a spin polarization layer.

Referring to FIG. 5, another embodiment of the present disclosure is shown wherein the order of forming layers on the main pole 1 is seed layer 51, OL 52, non-magnetic spacer 53, SP layer 54, and capping layer 55 to yield a STO 50 with a top spin valve configuration. The OL 52 and SP layer 54 have a composition and properties similar to OL 44 and SP layer 42, respectively. Likewise, non-magnetic spacer 53 has a composition like that of non-magnetic spacer 43 in the first embodiment. Seed layer 51 is a non-magnetic layer that is one or more of Ta, Ru, NiCr, or other metals or alloys employed as a seed layer in the art. Capping layer is single layer or composite comprised of one or more of Ta, Ru, and Cu, or may be a metal oxide layer that is made of one or more of MgO, AlOx, TaOx, or RuOx. As in the bottom STO embodiment, there are one or two metal oxide layers that contact the SP layer and enable the SP layer to have a thickness in the range of 20 to 30 Angstroms to significantly shrink the WG distance while generating substantial PMA and sufficient He to perform adequately as a spin polarization layer. In this case, one or both of non-magnetic spacer 53 and capping layer 55 may be a metal oxide layer. Direct or pulsed current polarity direction from source 18 will be in the opposite direction to that shown in FIG. 4 in order for the current to be spin polarized by the SP layer before acting on the OL.

Figure 6:
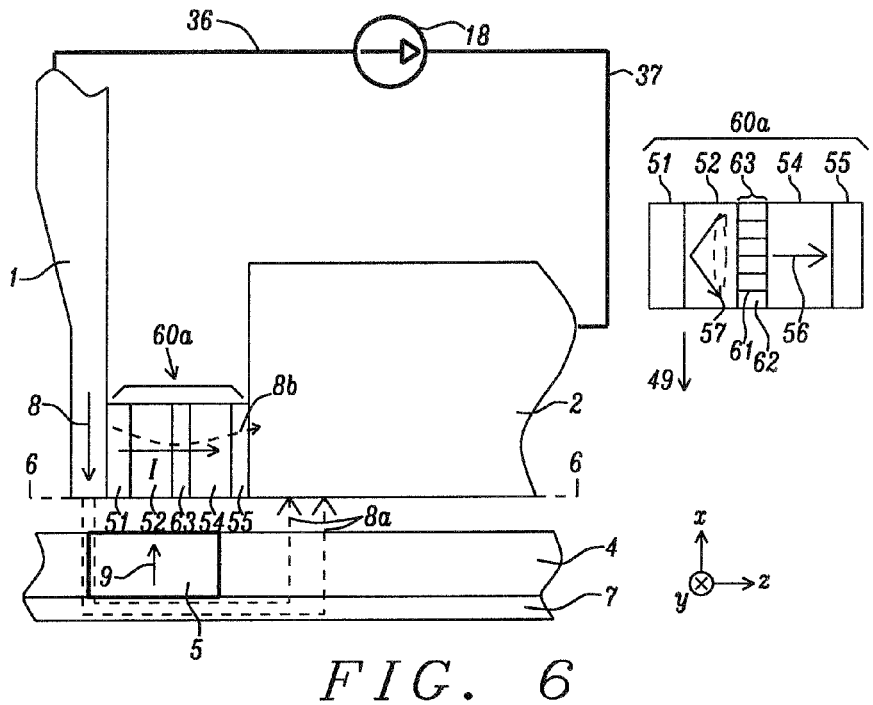
FIG. 6 is a modification of the MAMR structure in FIG. 5 wherein the STO has a confined current pathway (CCP) layer between a SP layer and an oscillation layer.
Figure 7:
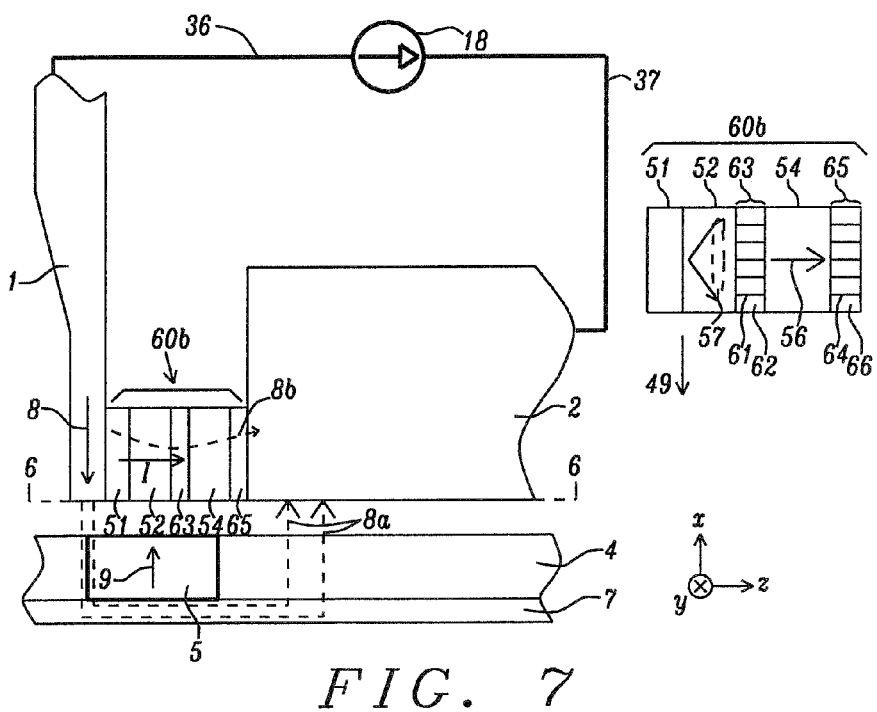
FIG. 7 is another embodiment of the present disclosure wherein the STO in FIG. 6 is modified to include a CCP layer as the capping layer in the STO stack.
Figure 8:
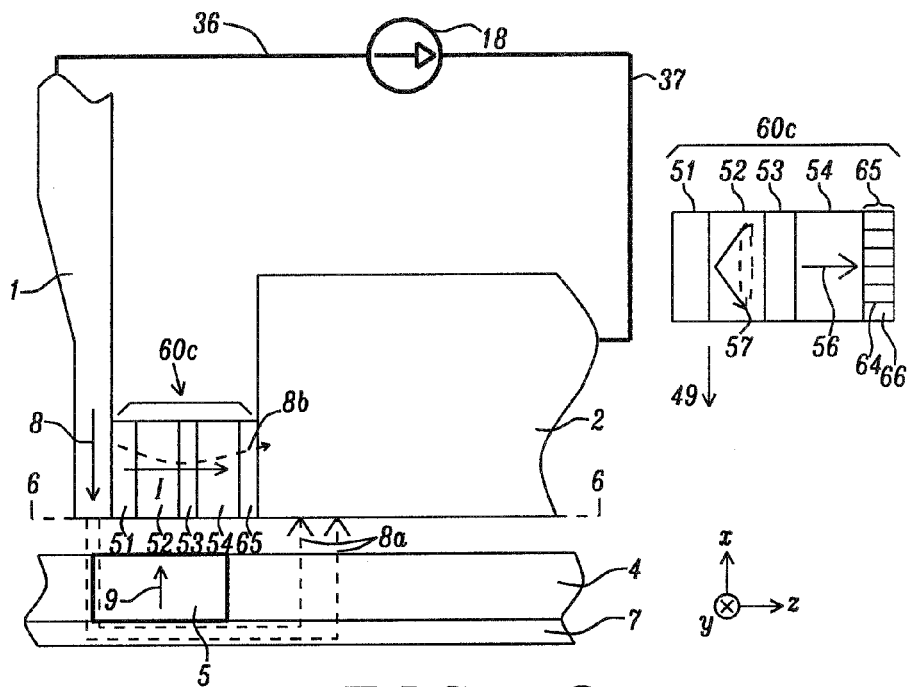
FIG. 8 is another embodiment of the present disclosure wherein the STO in FIG. 7 is modified to replace the CCP layer between the SP layer and OL with a non-magnetic spacer that is a metal oxide or a metal.

Referring to another embodiment of the present disclosure as depicted in FIGS. 6-8, STO 50 with a top spin valve configuration in FIG. 5 may be modified such that one or both of the non-magnetic spacer 53 and capping layer 55 have a confining current pathway (CCP) structure wherein metal pathways made of Cu or the like are formed in a metal oxide matrix. We have previously disclosed a CCP structure and a method of making the same in U.S. Pat. No. 7,978,442. The metal oxide layer may be comprised of Al, AlCu, Mg, MgCu, Ti, Cr, Zr, Ta, Hf, Fe, or the like. A pre-ion treatment (PIT) and ion-assisted oxidation step are used to convert a conductive metal into conductive pathways formed in the metal oxide matrix. This method may be employed to improve the conductivity and reliability of a STO stack compared with a STO described in FIG. 5 where a metal oxide layer is used as one or both of the non-magnetic spacer and capping layer on either side of the SP layer. It is understood that the magnitude of $E_{ani}$ is not as great as when a uniform metal oxide is employed for the SP layer/metal oxide interface. $H_{ani}$ will be reduced somewhat in proportion to the metal pathway content in the CCP layer.

Referring to FIG. 6, the STO structure is retained from FIG. 5 except that non-magnetic spacer 53 is replaced by a CCP layer 63 wherein conductive metal pathways 61 are formed within a metal oxide matrix 62. Note that the conductive pathways in STO 60a are formed substantially in a perpendicular to plane direction. In one aspect, the metal pathways may comprise about 10% of the CCP layer. However, the conductive metal content in the CCP layer may vary depending on the CCP layer thickness and the conditions during the PIT and IAO process steps. Preferably, when a CCP layer 63 is employed between the SP layer and OL, the capping layer 55 is a metal oxide layer to induce PMA in the SP layer.

In FIG. 7, the embodiment shown in FIG. 6 is further modified to include a second CCP layer 65 as a replacement for capping layer 55 to form STO 60b. Thus, CCP layer 65 has conductive pathways 64 formed within a metal oxide matrix 66. It should be understood that the conductive pathways in the second CCP layer may be formed of a different metal than the conductive pathways within CCP layer 63. Likewise, the metal or alloy selected for metal oxide matrix 66 may differ from the metal or alloy used to make metal oxide matrix 62.

Referring to FIG. 8, the present disclosure also encompasses an embodiment wherein the STO structure shown in FIG. 5 is modified to provide a STO structure 60c. All layers are retained from STO 50 except the capping layer which is replaced by a CCP layer 65 as previously described. Preferably, when a CCP layer is employed as the capping layer, the non-magnetic spacer 53 is a metal oxide layer in order to induce PMA in the SP layer. In all STO embodiments with a top spin valve configuration, PMA 56 in SP layer 54 is advantageously used to spin polarize a current I that causes OL 52 to have a large angle oscillation 57 for the purpose of producing a rf field 49 on the medium bit 5. Furthermore, the write gap may be reduced to 25 nm or less in view of the substantial decrease in SP layer thickness from ≥8 nm to less than 3 nm.

Figure 9:
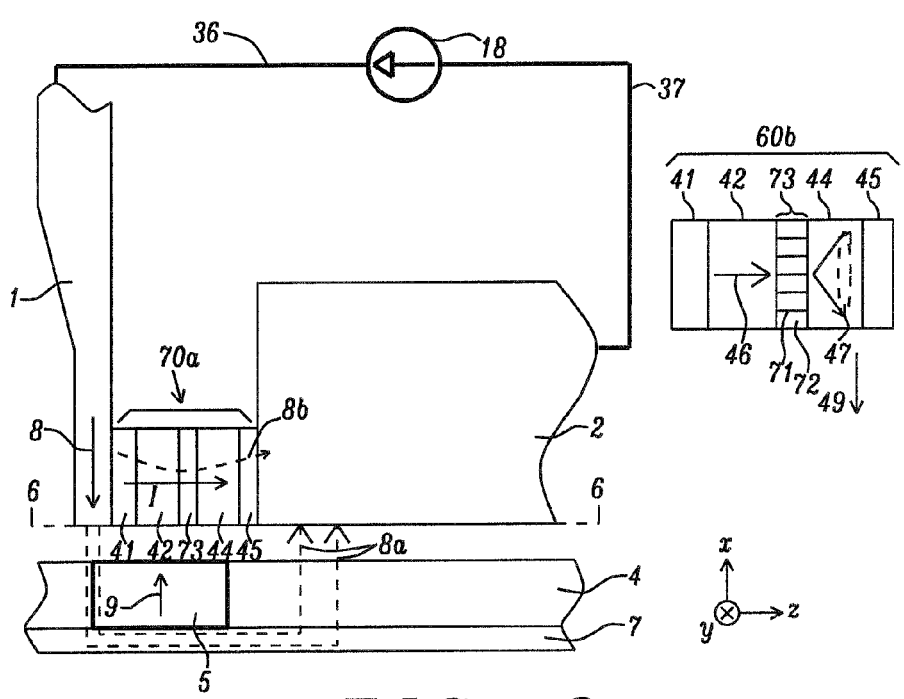
FIG. 9 is a modification of the MAMR structure in FIG. 4 wherein the STO has a confined current pathway (CCP) layer between a SP layer and an oscillation layer.
Figure 10:
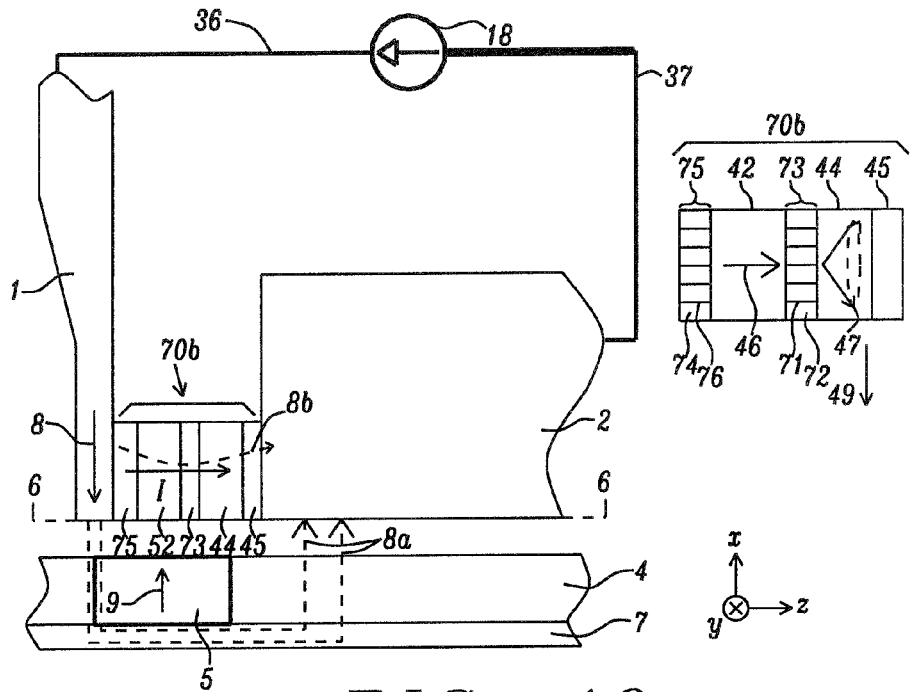
FIG. 10 is another embodiment of the present disclosure wherein the STO in FIG. 9 is modified to include a CCP layer as the seed layer in the STO stack.
Figure 11:
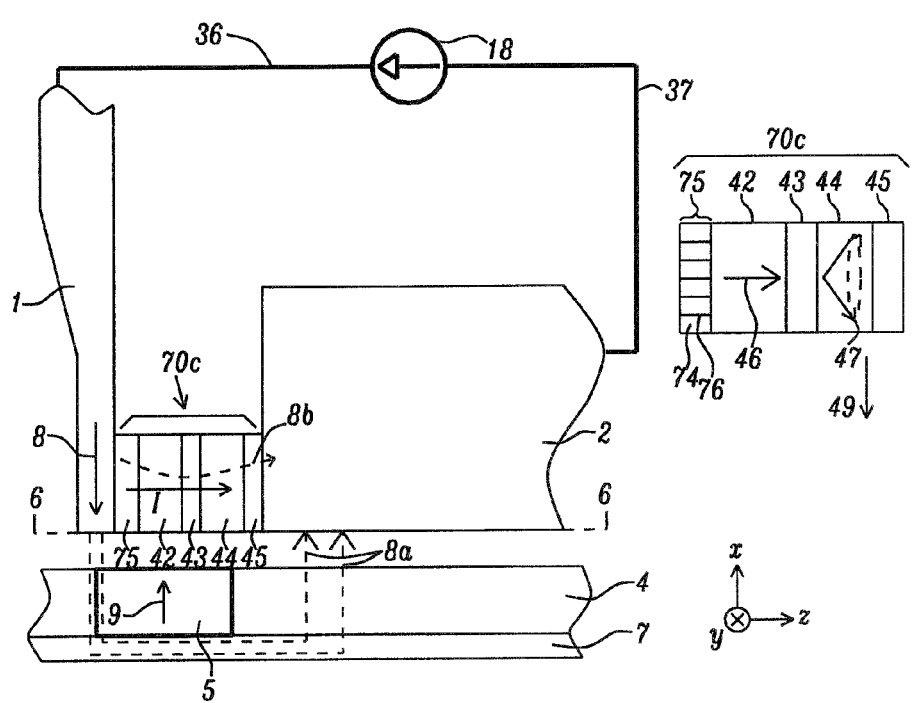
FIG. 11 is another embodiment of the present disclosure wherein the STO in FIG. 10 is modified to replace the CCP layer between the SP layer and OL with a non-magnetic spacer that is a metal oxide or a metal.

The present disclosure also anticipates that the STO in FIG. 4 may be modified to replace one or both of the seed layer 41 and non-magnetic spacer 43 with a CCP layer as illustrated by the embodiments found in FIGS. 9-11.

Referring to FIG. 9, the STO structure is retained from FIG. 4 except that non-magnetic spacer 43 is replaced by a CCP layer 73 wherein conductive metal pathways 71 are formed within a metal oxide matrix 72. The conductive pathways in STO 70a are formed substantially in a perpendicular to plane direction. The thickness and conductive metal content in the CCP layer may vary depending on the conditions during the PIT and IAO process steps used to form the CCP layer. Preferably, when CCP layer 73 is used between the SP layer and OL, the seed layer 41 is a metal oxide layer in order to induce PMA in SP layer 42.

In FIG. 10, the embodiment shown in FIG. 9 is further modified to include a second CCP layer 75 as a replacement for seed layer 41 to form STO 70b. Thus, CCP layer 75 has conductive pathways 76 formed within a metal oxide matrix 74. Conductive pathways in the second CCP layer 75 may be formed of a different metal than in the conductive pathways within CCP layer 73. Moreover, the metal or alloy selected for metal oxide matrix 72 may differ from the metal or alloy used to make metal oxide matrix 74.

Referring to FIG. 11, the present disclosure also encompasses an embodiment wherein the STO shown in FIG. 4 is modified to provide a STO structure 70c. All layers are retained from STO 40 except the seed layer is replaced by a CCP layer 75 as previously described. Preferably, when a CCP layer is used as the seed layer, the non-magnetic spacer 43 is a metal oxide layer so that PMA is induced in SP layer 42. In all STO embodiments with a bottom spin valve configuration, PMA 46 in SP layer 42 is advantageously used to spin polarize a current I that causes OL 44 to have a large angle oscillation 47 in order to generate a rf field 49 on the medium bit 5 that assists the write process. Moreover, a substantial reduction in the write gap to 25 nm or less is achieved because of a reduction in SP layer thickness from 8 nm or greater to less than 3 nm.

Figure 12:
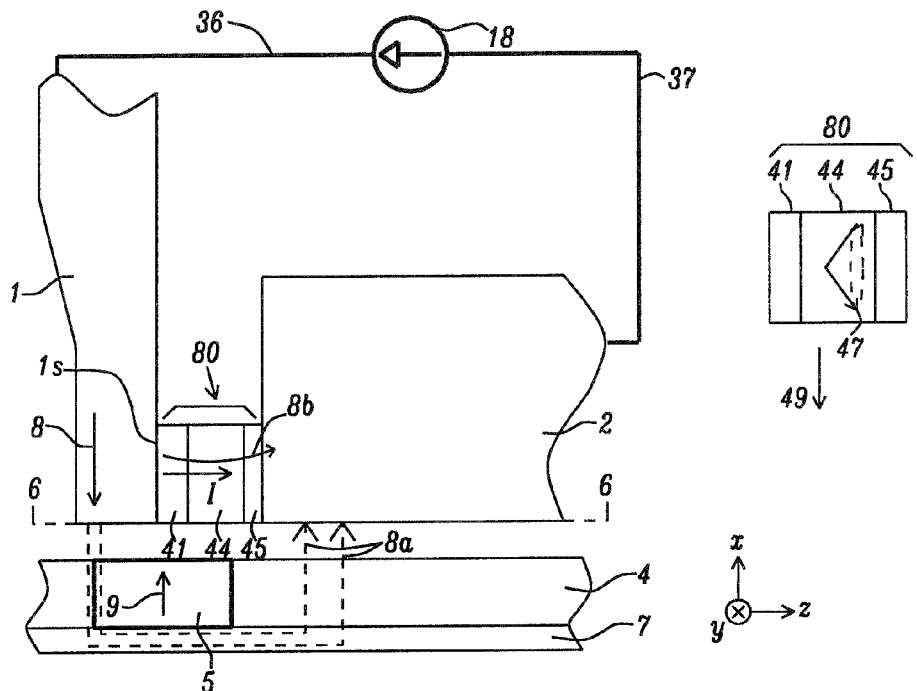
FIG. 12 is a down-track cross-sectional view of a MAMR structure according to another embodiment of the present disclosure wherein a metal oxide seed layer, oscillation layer, and capping layer are sequentially formed on a main pole layer.

Referring to FIG. 12, another embodiment of the present disclosure is depicted wherein the MAMR structure from FIG. 4 is retained except the SP layer and interlayer are omitted so that a seed layer 41 having a metal oxide composition, OL 44, and capping layer 45 are sequentially formed on the main pole 1 to yield STO 80. Here, the main pole/metal oxide interface 1s generates PMA in a portion of the main pole proximate to the seed layer. As a result, direct current or pulsed current I flowing through the main pole from lead 36 is spin polarized in a perpendicular to plane direction (perpendicular to interface 1s) and interacts with the OL to cause a large angle oscillation 47 therein with a frequency to produce a rf field 49 that assists the write process involving magnetization 9 in bit 5.

Figure 13:
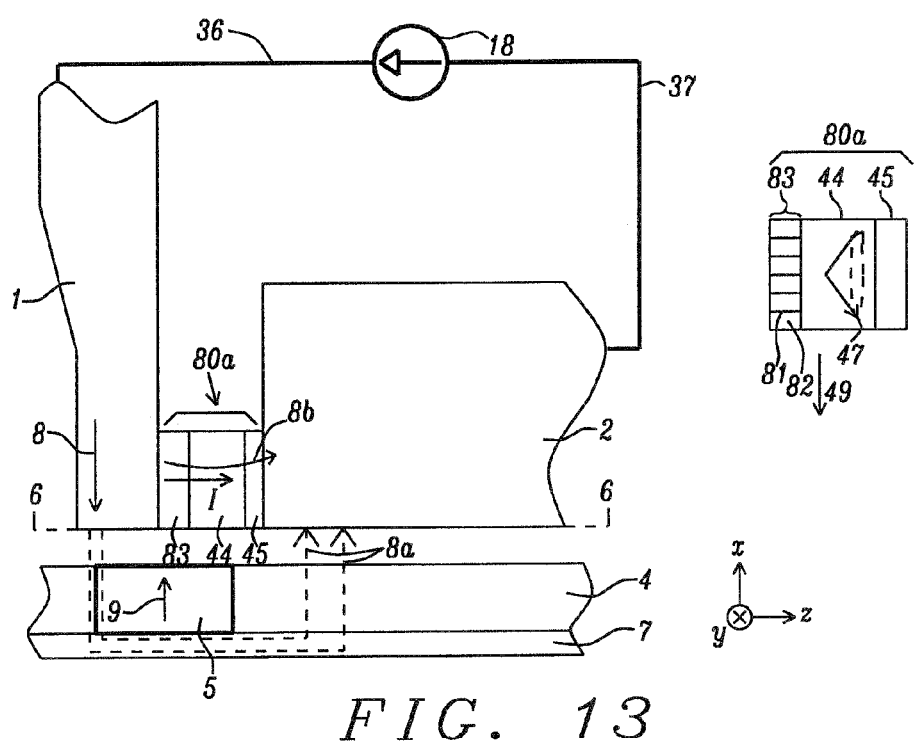
FIG. 13 is another embodiment of the present disclosure wherein the STO in FIG. 12 is modified to replace the seed layer with a CCP structure between the main pole and the OL.

In an alternative embodiment illustrated in FIG. 13, the metal oxide layer that serves as the seed layer in FIG. 12 may be modified to have a CCP structure 83 with confining current pathways 81 formed in a metal oxide matrix 82 as disclosed previously in U.S. Pat. No. 7,978,442. In effect, CCP structure 83 serves as a seed layer for uniform growth in overlying layers OL 44 and capping layer 45 in STO 80a. A CCP seed layer is expected to provide improved reliability for the STO device compared with an embodiment in FIG. 12 where the seed layer 41 is a conductive metal oxide layer with no metal pathways therein.

Figure 14:
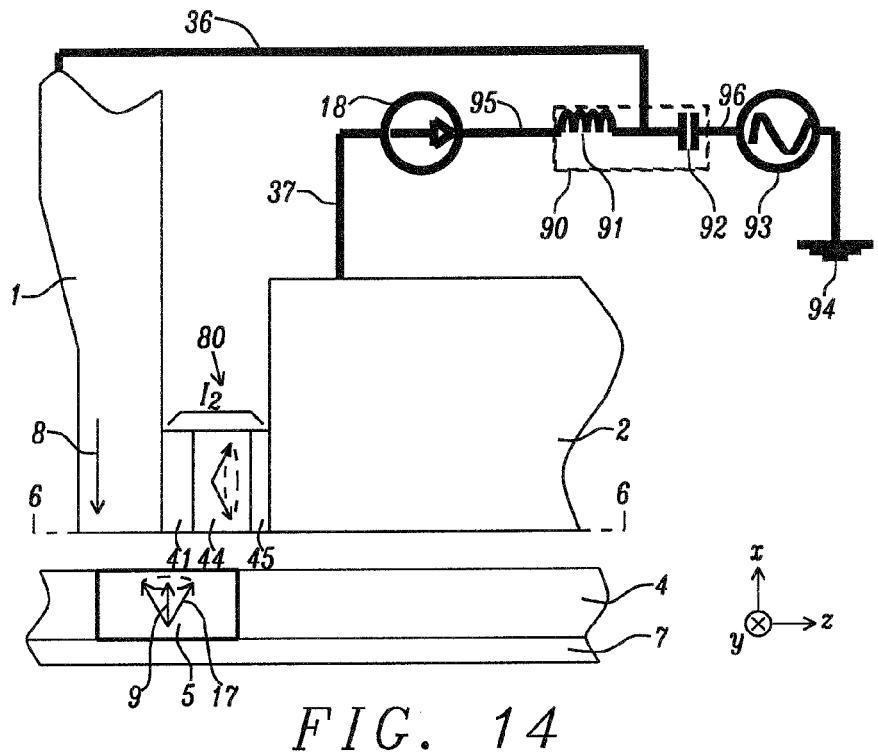
FIG. 14 is another embodiment of the present disclosure wherein a combination of a direct or pulsed current, and a rf current are injected into the main pole layer to enable OL frequency to be tuned and to reduce critical current density in the STO.

Referring to FIG. 14, another embodiment of the present disclosure involves the addition of a bias T 90 in the circuit between main pole 1 and write shield 2 such that rf current may be combined with dc or pulsed current to give a current $I_2$ that is injected into STO 80. Rf current with a frequency f from 0.1 to 50 GHz is produced by a rf current generator 93. Direct current or pulsed current source 18 is connected by lead 37 to write shield 2 and is also connected to the bias T 90 by lead 95. The dc terminal of the bias T is an inductor 91 with a typical inductance of 0.1 to 10 milli-Henry. For any current including dc with a frequency below the kHz regime, the impedance of the inductor is smaller than 100 Ohm so that dc and low frequency signal can pass. However, for a current with a frequency in the GHz regime, the impedance of the inductor 21 is greater than sub-MegaOhm which blocks the rf signal.

The bias T 90 has a rf terminal 92 that is a capacitor, preferably in the 1 nanofarad to 500 nanofarad regime. The rf terminal is connected to rf generator 93 by a lead 96. Thus, GHz frequency may pass with low impedance while low frequency current including dc is blocked with high impedance. In this way, both dc and rf current are injected from the bias T into STO 80 through lead 36 and main pole 1. One terminal of the rf generator may be connected to ground 94. However, the main pole and write shield are electrically floating.

When dc (or pulsed current) and rf current are simultaneously injected into STO 80 in a current perpendicular to plane (CPP) mode, the dc and rf current are spin polarized by main pole 1 and generate a spin transfer torque on OL 44 thereby leading to a large angle oscillation 47 therein with a certain amplitude and frequency that produces a rf field 49. We have disclosed in U.S. Pat. No. 8,582,240 that the frequency f1 at which OL 44 naturally oscillates may be tuned to a value f1' when the rf current frequency f equals the resonance frequency f0 for magnetization 9 in medium bit 5. Furthermore, the injection of rf current may be advantageously used for one or more beneficial effects including OL magnetization frequency locking, frequency pulling and mixing, and reduced critical current. The rms amplitude of rf current is preferably between 0.2 and $5 \times 10^8$ A/cm$^2$. The simultaneous injection of rf current with dc or pulsed current is another means of reducing direct or pulsed current density from around $10^8$ A/cm$^2$ to about $10^7$ A/cm$^2$. As a result, STO reliability is now in a safer regime with a lesser concern about electromigration and interlayer diffusion that are typically associated with a high current bias in conventional MAMR technology.

It should be understood that the approach of simultaneously injecting a dc or pulsed current in combination with rf current into the STO may also be applied to the embodiments shown in FIGS. 4-11 to reduce the critical current density and thereby improve device stability.

Figure 15:
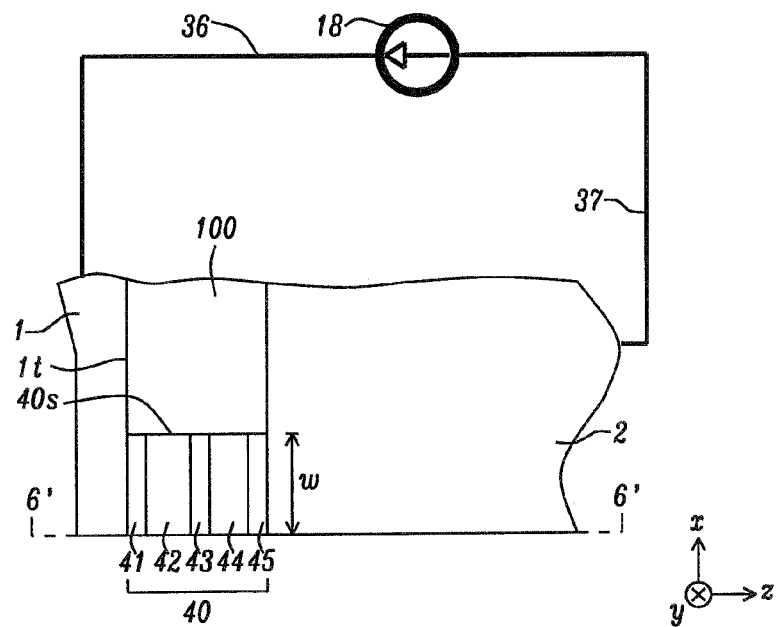
FIG. 15 is a down-track cross-sectional view of a portion of a PMR write head including a STO formed between a main pole and write shield.

The present disclosure also encompasses a microwave assisted magnetic recording (MAMR) write head and a method of making the same on a substrate that may comprise a read head structure in a PMR head with a combined write head/read head configuration. Referring to FIG. 15, a main pole 1 is provided with a side along a plane 6'-6' that becomes the eventual air bearing surface (ABS) following a back end lapping process. The main pole has a top surface 1t facing a down-track direction. Next, a STO structure 40 is formed on the top surface of the main pole such that a side of the STO is at the ABS, and all layers in the STO stack have a top surface formed parallel to the main pole top surface, and wherein the plane of each layer is aligned orthogonal to the ABS.

According to the exemplary embodiment, the STO stack has a seed layer/SP layer/non-magnetic spacer/OL/capping layer configuration as represented by layers 41-45 described previously. In an alternative embodiment (FIG. 5), the STO stack has a top spin valve configuration wherein layers 51, 52, 53, 54, and 55 described in a previous embodiment are sequentially formed on the main pole. It should also be understood that one or more of the layers 41, 43 may be replaced by CCP layers 75, 73, respectively, in a bottom spin valve embodiment (FIGS. 9-11), and that one or more of the layers 53 and 55 may be replaced by a CCP layer 63, 65, respectively, in a top spin valve embodiment (FIGS. 6-8).

Returning to FIG. 15, the STO stack of layers is patterned by a conventional photolithography and etch sequence to form a sidewall 40s that is parallel to the ABS and is separated therefrom by a distance w. An insulation layer 100 may be formed on portions of the main pole not covered by the patterned STO. Then, the write shield 2 is deposited on a top surface of the insulation layer and on the capping layer 45. An external current source 18 is connected to the main pole and to the write shield by leads 36, 37. Thereafter, the write head is completed by using conventional methods to form additional layers on the write shield, and a lapping process is performed to generate an ABS 6-6 (FIGS. 4-11) that is proximate to the plane 6'-6' shown in FIG. 15.

The embodiments of the present invention provide an advantage over conventional MAMR designs in several aspects. First, the incorporation of one or two metal oxide layers along top and bottom surfaces of the SP layer enable PMA therein and allow a significantly thinner SP layer than in the prior art. The one or two metal oxide layers are also typically thinner than a conventional non-magnetic spacer with the result that total STO thickness (equivalent to write gap spacing between main pole and write shield) is reduced by at least 6-8 nm to enable better areal density capability. Accordingly, the write gap target of 25 nm or less for current and future generations of MAMR devices is satisfied while maintaining other STO properties. STO reliability may be optimized by a combination of one or more modifications including (a) pulsed current rather than direct current injection into the STO; (b) replacing one or both metal oxide non-magnetic spacers adjoining the SP layer with a CCP structure; (c) omitting the SP layer and one non-magnetic spacer such that the main pole/seed layer interface generates polarized current; and (d) simultaneous injection of dc or pulsed current and rf current to enable a smaller critical current density in the STO device. The STO devices disclosed herein may be fabricated with standard materials and methods without any additional steps to complicate the manufacturing process flow.

While the present disclosure has been particularly shown and described with reference to, the preferred embodiment thereof, it will be understood by those skilled in the art that various changes in form and details may be made without departing from the spirit and scope of this disclosure.

We claim:

1. A microwave assisted magnetic recording (MAMR) structure that includes a write head, comprising:
   (a) a main pole that generates a magnetic flux field which is directed through a pole tip at an air bearing surface (ABS) and into a magnetic medium to write one or more bits, the magnetic flux field has a gap field component that is directed across a spin torque oscillator (STO) and into a write shield;
   (b) the write shield with a side at the ABS that collects magnetic flux which has passed through the magnetic medium and written the one or more bits;

(c) an external current source that produces a current consisting of a pulsed current in an electrical connection between the main pole and write shield, and across the STO; and (d) the STO that is formed along the ABS and generates a rf field on the magnetic medium and thereby assists the writing to one or more bits, the STO comprises;
  (1) a spin polarization (SP) layer which is a single layer of CoFeB, FeB, or CoB with perpendicular magnetic anisotropy (PMA) that spin polarizes the pulsed current in a direction perpendicular to a top surface of the SP layer and towards an oscillation layer (OL);
  (2) the oscillation layer (OL) wherein the spin polarized current of a critical current density from the SP layer causes magnetization in the OL to oscillate with a sufficiently large angle and frequency to generate the rf field on the magnetic medium to assist the writing to one or more bits;
  (3) a non-magnetic spacer between the SP layer and OL;
  (4) a seed layer formed between the main pole and the OL; and
  (5) a capping layer formed between the SP layer and the write shield wherein at least one of the capping layer and the non-magnetic spacer comprises a metal oxide layer that induces the PMA in the SP layer.

2. The MAMR structure of claim 1 wherein the SP layer is comprised of CoFeB, CoFe, a Co alloy, or a Fe alloy with a thickness less than 30 Angstroms.

3. The MAMR structure of claim 1 wherein the PMA in the SP layer may be increased by decreasing a SP layer thickness and by employing a metal oxide layer in both of the capping layer and non-magnetic spacer.

4. The MAMR structure of claim 1 wherein back scattered spin polarized current from the OL works with a damping torque to stabilize the SP layer against undesired magnetization switching in the SP layer.

5. The MAMR structure of claim 1 wherein a thickness of the STO in a down-track direction between the main pole and write shield represents a write gap (WG) distance, and the WG distance is about 25 nm or less.

6. The MAMR structure of claim 1 wherein the capping layer is a metal oxide layer or laminate that is comprised of one or more of MgO, AlOx, TaOx, and RuOx.

7. The MAMR structure of claim 1 wherein the non-magnetic spacer is a metal oxide layer or laminate that is comprised of one or more of AlOx, MgO, AlTiOx, MgZnOx, and ZnOx.

8. The MAMR structure of claim 1 wherein both of the capping layer and non-magnetic spacer are metal oxide layers, the capping layer is comprised of one or more of MgO, AlOx, TaOx, and RuOx, and the non-magnetic spacer is comprised of one or more of AlOx, MgO, AlTiOx, MgZnOx, and ZnOx.

9. The MAMR structure of claim 1 wherein the OL is comprised of a Co alloy, a Fe alloy, or is a laminate with an (A1/A2)$_n$ stack of layers where n is a lamination number, A1 is one of Co, Fe, CoFe, CoFeR in which R is a non-magnetic element, and A2 is one of Ni, NiCo, and NiFe.

10. The MAMR structure of claim 1 wherein a rf current that is provided by a rf current generator is combined with the pulsed current through a bias T in the electrical connection across the STO to reduce the critical current density.

11. A microwave assisted magnetic recording (MAMR) structure that includes a write head, comprising:
  (a) a main pole that generates a magnetic flux field which is directed through a pole tip at an air bearing surface (ABS) and into a magnetic medium to write one or more bits, the magnetic flux field has a gap field component that is directed across a spin torque oscillator (STO) and into a write shield;
  (b) the write shield with a side at the ABS that collects magnetic flux which has passed through the magnetic medium and written the one or more bits;
  (c) an external current source that produces a direct current or pulsed current between the main pole and write shield, and across the STO; and
  (d) the STO that is formed along the ABS and generates a rf field on the magnetic medium and thereby assists the writing to one or more bits, the STO comprises;
    (1) a spin polarization (SP) layer with perpendicular magnetic anisotropy (PMA) that spin polarizes the direct current or pulsed current in a direction perpendicular to a top surface of the SP layer and towards an oscillation layer (OL);
    (2) the oscillation layer (OL) wherein the spin polarized current of a critical current density from the SP layer causes magnetization in the OL to oscillate with a sufficiently large angle and frequency to generate the rf field on the magnetic medium to assist the writing to one or more bits;
    (3) a non-magnetic spacer that is made of a metal oxide between the SP layer and OL;
    (4) a seed layer formed between the main pole and the OL; and
    (5) a capping layer that consists of RuOx, or RuOx with TaOx or AlOx and formed between the SP layer and the write shield wherein the non-magnetic spacer and capping layer induce the PMA in the SP layer.

* * * * *